(12) United States Patent
Bentley et al.

(10) Patent No.: US 12,531,384 B2
(45) Date of Patent: Jan. 20, 2026

(54) THERMAL MANAGEMENT FOR A METER COLLAR ADAPTER

(71) Applicant: ConnectDER, Inc., Philadelphia, PA (US)

(72) Inventors: Katie Bentley, Philadelphia, PA (US); John Schroeder, Philadelphia, PA (US); Jonathan Knauer, Philadelphia, PA (US); Benjamin Lewis, Philadelphia, PA (US); Whitman Fulton, Philadelphia, PA (US)

(73) Assignee: ConnectDER, Inc., Philadelphia, PA (US)

( * ) Notice: Subject to any disclaimer, the term of this patent is extended or adjusted under 35 U.S.C. 154(b) by 474 days.

(21) Appl. No.: 17/938,243

(22) Filed: Oct. 5, 2022

(65) Prior Publication Data

US 2023/0107831 A1    Apr. 6, 2023

Related U.S. Application Data

(60) Provisional application No. 63/252,796, filed on Oct. 6, 2021.

(51) Int. Cl.
*H01R 31/06* (2006.01)
*H01R 13/502* (2006.01)
*H01R 4/06* (2006.01)
*H01R 13/11* (2006.01)

(52) U.S. Cl.
CPC ........... *H01R 31/06* (2013.01); *H01R 13/502* (2013.01); *H01R 4/06* (2013.01); *H01R 13/11* (2013.01); *H01R 2201/20* (2013.01)

(58) Field of Classification Search
CPC ........ H01R 31/06; H01R 13/502; H01R 4/06; H01R 13/11; H01R 2201/20; H01R 31/065
See application file for complete search history.

(56) References Cited

U.S. PATENT DOCUMENTS

| 5,956,223 | A  | * | 9/1999  | Banting  | H02H 9/044 361/111 |
| 6,200,158 | B1 | * | 3/2001  | Robinson | H01R 13/6397 439/146 |
| 6,633,476 | B1 | * | 10/2003 | Allina   | G01R 11/25 361/111 |
| 2008/0197961 | A1 | * | 8/2008 | Patel | H01F 21/12 336/170 |
| 2010/0321003 | A1 | * | 12/2010 | Geiger | G01R 11/04 324/127 |
| 2023/0107831 | A1 | * | 4/2023 | Bentley | H01R 13/502 439/487 |

* cited by examiner

*Primary Examiner* — Abdullah A Riyami
*Assistant Examiner* — Nader J Alhawamdeh
(74) *Attorney, Agent, or Firm* — HSML P.C.

(57) ABSTRACT

A meter collar adapter may include an upper assembly having a housing to protect inner electrical components from adverse environmental conditions and a lower assembly to house electrical components, one or more conductors that pass through at least the lower assembly. Each conductor includes a first end to electrically interface with a meter socket and a second end to electrically interface with an electrical meter. The meter collar adapter further includes thermally conductive heat sinks to transfer heat from the lower assembly.

16 Claims, 7 Drawing Sheets

THERMAL MANAGEMENT FOR A METER COLLAR ADAPTER

TECHNICAL FIELD

The embodiments described herein pertain generally to management of heat within a meter collar adapter.

BACKGROUND

A meter collar adapter (MCA) may be implemented as an electrical and/or communicative conduit, device, or pathway between a meter socket on a residential or commercial service and a utility-provided electricity meter. In addition to providing electrical connectivity from an electrical grid to the residence or commercial structure, an MCA allows for quick integration of alternate sources of electrical energy to the residence or commercial structure.

For residential applications, an MCA may pass loads of up to 200 A while operating in an ambient temperature range of −40° C. to 85° C. Ambient temperature is one of various environmental conditions, which also include solar heating and/or heat generated by a flow of load current, that may cause a temperature increase inside an MCA that exceeds product-related UL standard thresholds and/or rated operating values of electronic components within the MCA.

SUMMARY

The embodiments described and recited herein pertain generally to conducting thermal buildup from an interior of a meter collar adapter. In accordance with at least one example embodiment, the thermal buildup is dissipated to an outer surface of the meter collar adapter to maintain an intended current rating for the meter collar adapter.

In one example embodiment, a meter collar adapter includes an upper assembly that includes an outer housing to protect inner electrical components from adverse environmental conditions and a lower assembly to house electrical components, one or more conductors that pass through at least the lower assembly. Each of the conductors includes a first end to electrically interface with a meter socket and a second end to electrically interface with an electrical meter. The meter collar adapter further includes one or more thermally conductive heat sinks to transfer heat, e.g., out of and/or away from the lower assembly and the meter collar adapter.

In another example embodiment, a meter collar adapter, includes an upper assembly comprising an outer housing and a lower assembly to house electrical components, one or more conductors that pass through at least the lower assembly. Each of the one or more conductors includes a first end to electrically interface with a meter socket and a second end to electrically interface with an electrical meter. The meter collar adapter further includes the one or more conductor having laterally facing clamps to secure the second end of a corresponding one of the conductors therebetween.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1A:
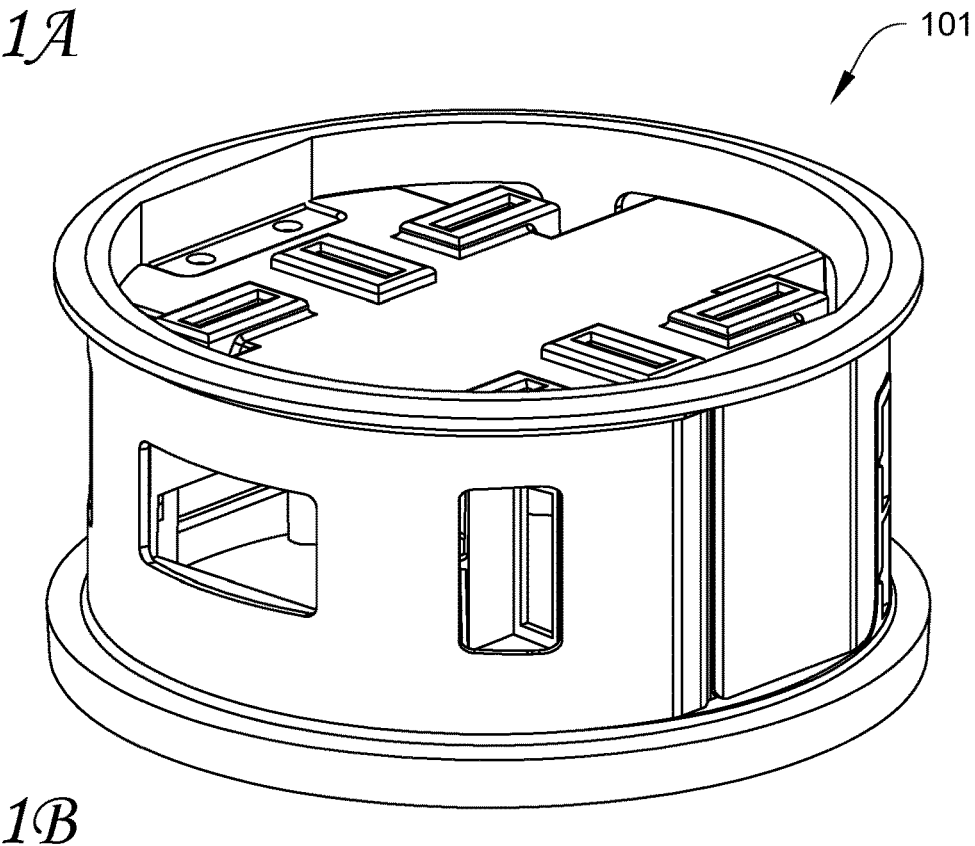
FIG. 1A shows a non-limiting example of a meter collar assembly, in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In the present description and recitation, in addition to its accepted meaning, the following terms may be used as follows:

Residence may refer to a dwelling unit or other free-standing structure for which energy consumption is managed and/or measured. Although such structures may include places of business, for the purpose of the present description and recitation, reference is made to "residence" or "residences" without excluding a place or places of business or commerce. Further, a meter socket may refer to a type of electrical socket that is manufactured, designed, and/or configured to connect an electrical meter to a residence.

A meter collar assembly (MCA) or a meter socket adapter (MSA), may be regarded as a connector and/or intermediary between a meter socket on a residence and an electrical meter. Throughout this disclosure and recitation, MCA and MSA may be referenced in the alternative, though primary reference will be made to MCA.

In addition to providing electrical connectivity from the utility, e.g., grid, to the residence, an MCA may implement integration of additional managed loads or alternate sources of electrical energy to the residence.

Further, in order to achieve UL Listing, a meter socket accessory must pass a UL 414 heating test, which is conducted at a customized or targeted current rating, e.g., of the manufacturer's choosing. Typically, though not exclusively, the current rating is not less than 160 A continuous for devices to be used in a 200 A socket in an ambient temperature range of −40° C. to 85° C. For a residential billing meter and meter socket, a 200 A continuous rating is preferred, but may be higher than service entrance conductors and a residence main breaker. The values referenced herein are provided as examples only, for the purpose of providing an enabling disclosure, and are not intended to be limiting in any manner, since capabilities and/or standards may evolve.

Non-limiting example embodiments of structures are described and recited below.

Figure 1B:
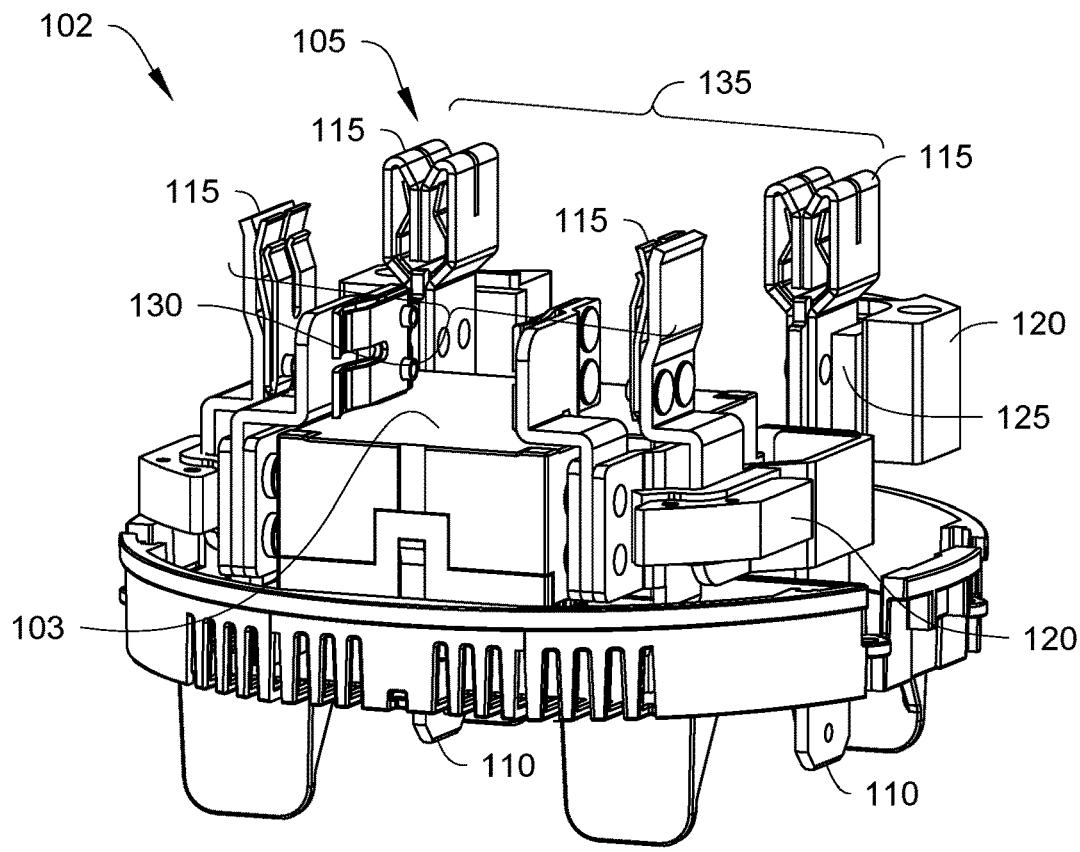
FIG. 1B shows a non-limiting example of an upper assembly of the meter collar assembly of FIG. 1A, in accordance with at least some embodiments described and recited herein.
Figure 1C:
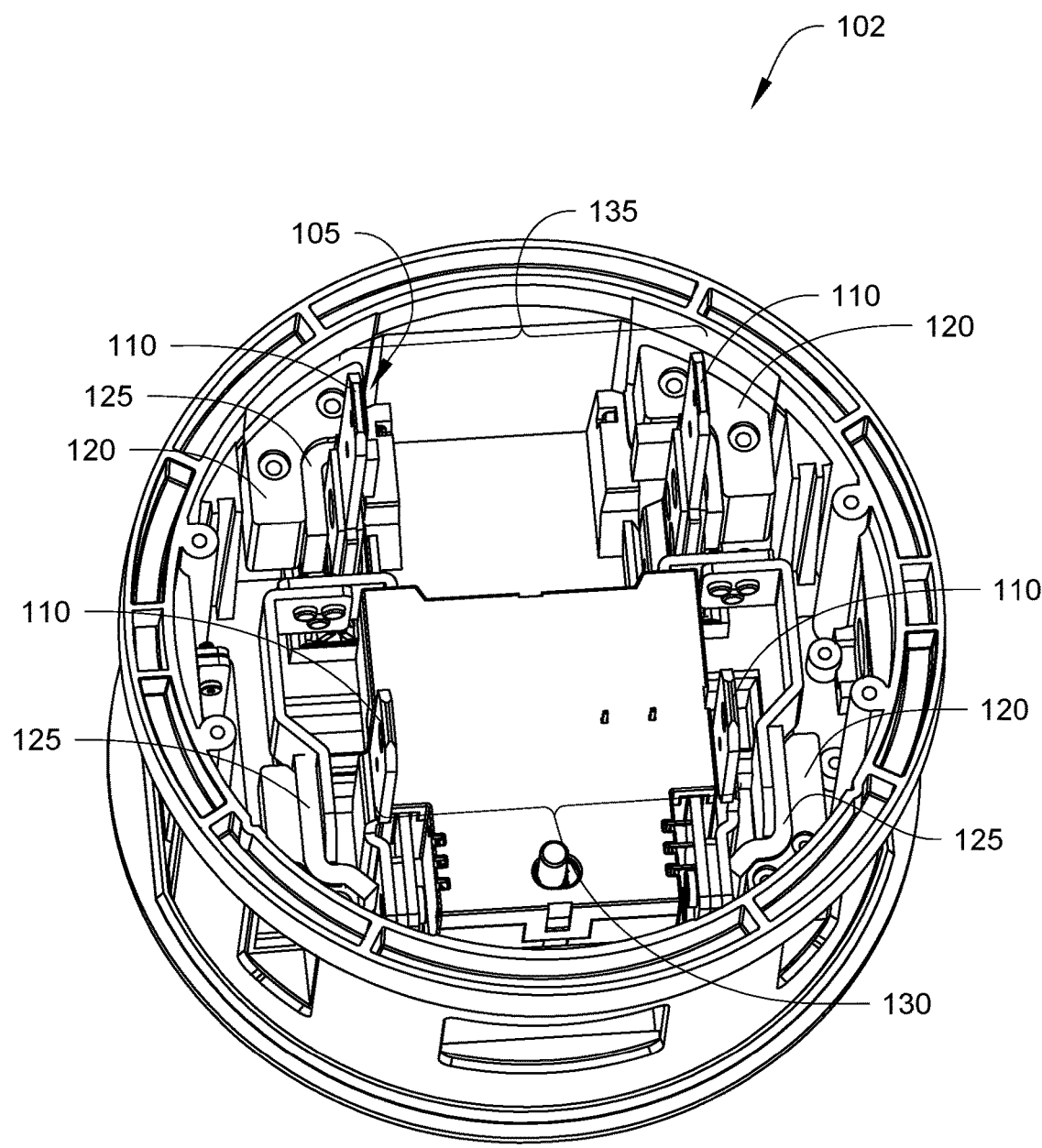
FIG. 1C shows a non-limiting example of a lower assembly of the meter collar assembly of FIG. 1A, in accordance with at least some embodiments described and recited herein.
Figure 1D:
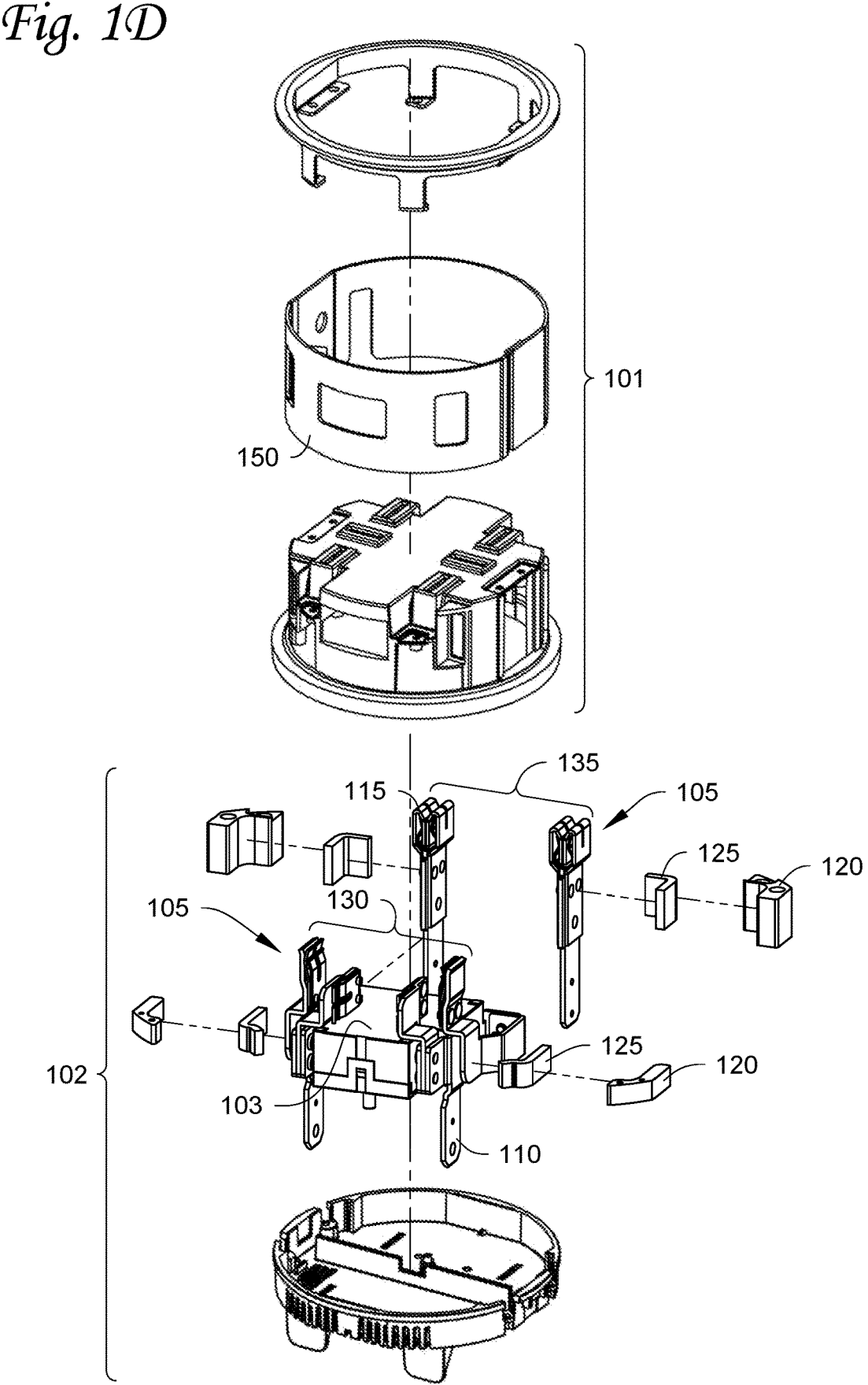
FIG. 1D shows a non-limiting example of an exploded view of a meter collar assembly, in accordance with at least some embodiments described and recited herein.

FIG. 1A shows a non-limiting example of an upper assembly of the meter collar assembly. FIG. 1B shows a non-limiting example of a lower assembly of the meter collar assembly. FIG. 1C shows a non-limiting example of electrical components of meter collar assembly 100 from a bottom view of the combined meter collar assembly of FIGS. 1A and 1B with transparency through a bottom of the lower housing for clarity. FIG. 1D shows a non-limiting example of an exploded view of the electrical components of meter collar assembly 100, in accordance with at least some embodiments described and recited herein.

As depicted in FIG. 1A-1D, in accordance with at least one non-limiting example embodiment, an assembled meter collar assembly 100 may include upper assembly 101 having an outer housing to protect inner electrical components from adverse environmental conditions and may serve to draw heat from an interior of the assembled meter collar assembly 100; lower assembly 102 to house electrical components; and one or more conductors that pass through at least lower assembly 102. The one or more conductors may include first end 110 to electrically interface with a meter socket, e.g., a facility electrical meter socket that is installed at a residence, such as, a home or business building, and second end 115 to electrically interface with an electrical meter. The meter collar assembly may further include one or more thermally conductive heat sinks 120 to transfer heat out the lower assembly, for example, through a thermal conduction pathway from the lower assembly to the upper assembly. Meter collar assembly 100, in accordance with at least one alternative embodiment, may further include one or more thermal interfaces 125, one or more line side connections 130, and one or more load side connections 135.

Upper assembly 101 may refer to an outer covering or housing for the internal active and passive components of MCA 100. Upper assembly 101 may provide environmental protection for the internal components, while also housing thermal components to draw heat from the internal components, e.g., a heat sink, thermal interface material, or the like. The upper assembly 101 may be made from plastic, a thermally-conductive and/or electrically isolating metal, polymer, or the like. The upper assembly 101 may include a thermally conductive outer surface to passively dissipate heat from the interior of the MCA 100, e.g., thermal transfer of heat to the ambient environment without fans, pumps, or the like. The thermally conductive outer surface may include polymers, such as silicone rubber, an aluminum oxide, boron nitride, silicon nitride, aluminum nitride, beryllium oxide, a ceramic, coated metals, etc.

Lower assembly 102 may refer to a housing for the aforementioned internal active and passive components of MCA 100, including all electronic circuitry therefore. In accordance with at least one non-limiting example embodiment, lower assembly 102 may include the one or more conductors 105 attached or otherwise connected to the lower assembly 102 so that the one or more conductors 105 extend through a bottom housing of the lower assembly 102 to connect to the meter socket. The lower assembly 102 may also include a relay 103 connecting the load side of the MCA 100 with a co-located equipment, such as, solar panels, electric vehicles, generators, or the like; a lower housing for interfacing the meter socket; or the like. The lower assembly 102 and upper assembly 101 are configured to be connected to each other to form the MCA 100, for example, by screws, clips, clamps, etc.

One or more conductors 105, in the singular, may otherwise be referenced herein as a "blade" or "blade assembly," and may refer to an electrical conductor or bus, of which there may be one or more that pass through a body of MCA 100 to electrically connect the electrical meter and the meter socket, in accordance with the embodiments described and recited herein. The one or more conductors 105 may include a first end 110, which may refer to an end of a blade that interfaces with the electrical meter socket corresponding to the residence, and may be otherwise referred to herein as a "stab." A stab, as known in the art, is provided in accordance with applicable ANSI standards. The one or more conductors 105 may also include a second end 115, which may refer to an end of a blade that interfaces, for example, with the electrical meter, and may be otherwise referred to herein as a "jaw." A jaw may be configured to receive a stab of the electrical meter or another end of a conductor, for example, a stab from an interface for the co-located equipment. A jaw, as known in the art, is provided in accordance with applicable ANSI standards.

In accordance with one or more embodiments described and recited herein, second end 115 may be configured by having two laterally facing clamps enclosing a top portion of a conductor 105. The top portion of conductor 105 may be regarded as the portion that is proximate to the electrical meter. The clamps may be substantially similar in width as the conductor 105, and may be fastened to conductor 105 by pins, rivets, or welding. Top portions of the clamps may extend beyond a top portion of conductor 105, and the top portions of the clamps may electrically interface with the electrical meter. Thus, second end 115, with the clamps fastened thereto, may increase current-carrying surface area of conductor 105.

Second end 115 and the aforementioned clamps are described in more detail below with regard to FIGS. 4A and 4B.

One or more connectors 105 may be used for line side connections 130, which may refer to an interface circuit provided to connect MCA 100 to a line side, i.e., utility side, of a service disconnect. The line side connector may include one or more service lines, in which each of the connectors 105 correspond to the service lines, e.g., L1 and/or L2. The one or more connectors 105 may also be used for load side connections 135, which may refer to an interface circuit provided to connect MCA 100 to a load side, i.e., residence/customer side, of a service disconnect.

Thermally conductive heat sinks 120 may be provided in the upper assembly 101 or the lower assembly 102 or a combination thereof. Thermally conductive heat sinks 120 may be adjacent to the one or more conductors 105, e.g., in thermal contact, to transfer heat from the one or more conductors 105 out of the lower assembly.

Thermally conductive heat sinks 120 may refer to heat sinks, as known in the art, made of thermal conducting material, such as, copper, gold, aluminum, etc., and/or electrically non-conductive but thermally conducting material, such as, e.g., polymers, such as silicone rubber, an aluminum oxide, boron nitride, silicon nitride, aluminum nitride, beryllium oxide, a ceramic, coated metals, etc. It is also appreciated that the thermally conductive heat sinks 120 may include other passive heat-transfer devices, for example, a heat pipe that employs phase transition to transfer heat, e.g., at a hot interface of the a heat pipe, a volatile liquid turns into a vapor by absorbing heat and travels to the cold interface and condenses back into a liquid, in which the liquid returns to the hot interface through capillary action, centrifugal force, or gravity. Because environmental conditions such as ambient temperature, solar heating, and/or heat generated due to the flow of electrical current, internal temperatures of MCA 100 could rise to levels well in excess of the allowed UL standard threshold and/or the rated operating values of the internal electronic components. Thus, the one or more heat sinks 120 may be provided to channel thermal buildup from within MCA 100 to an outer surface of upper assembly 101.

Thermal interface material 125 may refer to a non-electrically conductive thermal interface between respective ones of heat sinks 120 and a corresponding one of the conductors 105, e.g., providing thermal contact between the conductor and heat sinks 120. In accordance with at least one non-limiting example embodiment, thermal interface material 125 may be formed from an electrically insulating but thermally conducting material, such as, e.g., a polymer, such as silicon rubber, an aluminum oxide, boron nitride, silicon nitride, or the like. Preferably, in an embodiment, thermal interface material 125 is a flexible and/or compressible material, so that when the MCA 100 is assembled, thermal interface material 125 is compressed between heat sink 120 and conductor 105 to provide a thermal interface. Because thermal interface material 125 is non-electrically conductive, each of thermal interfaces 125 may contribute to electrically isolating upper assembly 101 and bottom assembly 102, which may be conducive to a touch-safe implementation of MCA 100.

As seen in FIG. 1D of the exploded view of meter collar assembly 100, in accordance with one or more embodiments described and recited herein, the upper assembly 101 may include a main body to enclose and protect the inner electrical components from the adverse environmental conditions and an outer surface 150 that is provided around or surrounding and in contact with the main body. The main body of the upper assembly 101 encloses the inner electrical components of the lower assembly 102 which may include a relay 103 that may be electrically connected to one or more conductors 105, in which the one or more conductors 105 may include a first end 110 and a second end 115. The meter collar assembly 100 may further include one or more thermal interfaces 125 that may be in thermal contact with one or more thermally conductive heat sinks 120, in which the one or more thermally conductive heat sinks 120 are in thermal contact with the main body of the upper assembly 101 and the outer surface 150. The lower assembly 102 may include a bottom that houses the electrical components. The upper assembly 101 may include a retainer to connect the lower assembly 102 and upper assembly 101 to form the MCA 100, for example, the retainer may engage the outer surface 150 and the outer surface 150 may engage the housing, and screws may be provided to fix the upper assembly 101 to the bottom of the lower housing 102. The assembled meter collar assembly 100 may then be configured to have one or more line side connections 130 and one or more load side connections 135.

Figure 2:
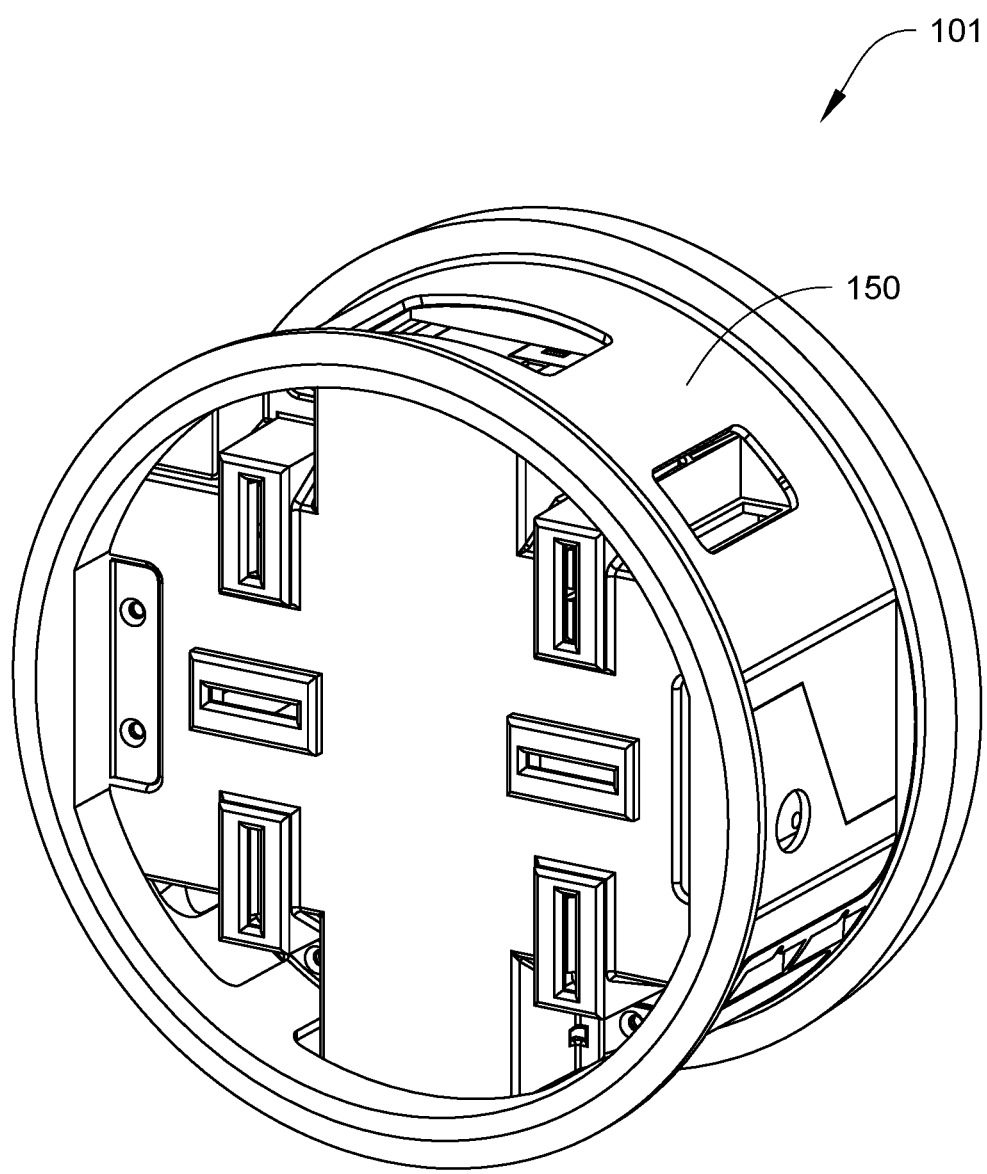
FIG. 2 shows a non-limiting example of an outer housing of a meter collar adapter, in accordance with at least some embodiments described and recited herein.

FIG. 2 shows a non-limiting example of an outer housing of a meter collar adapter, in accordance with at least some embodiments described and recited herein.

Upper assembly 101 may have coated or enameled on outer surface 150 thereof, or be composed of, a thermally conductive material. Accordingly, when upper assembly 101 and lower assembly 102 are engaged with each other and as one or more stabs 110 and one or more jaws 112 are electrically connected to a meter socket and electrical meter, respectively, heat generated in the MCA 100 may be drawn from within the interior of MCA 100 and dissipated across outer surface 150. Outer surface 150 may then cool through natural convection, e.g., to the ambient environment.

Figure 3:
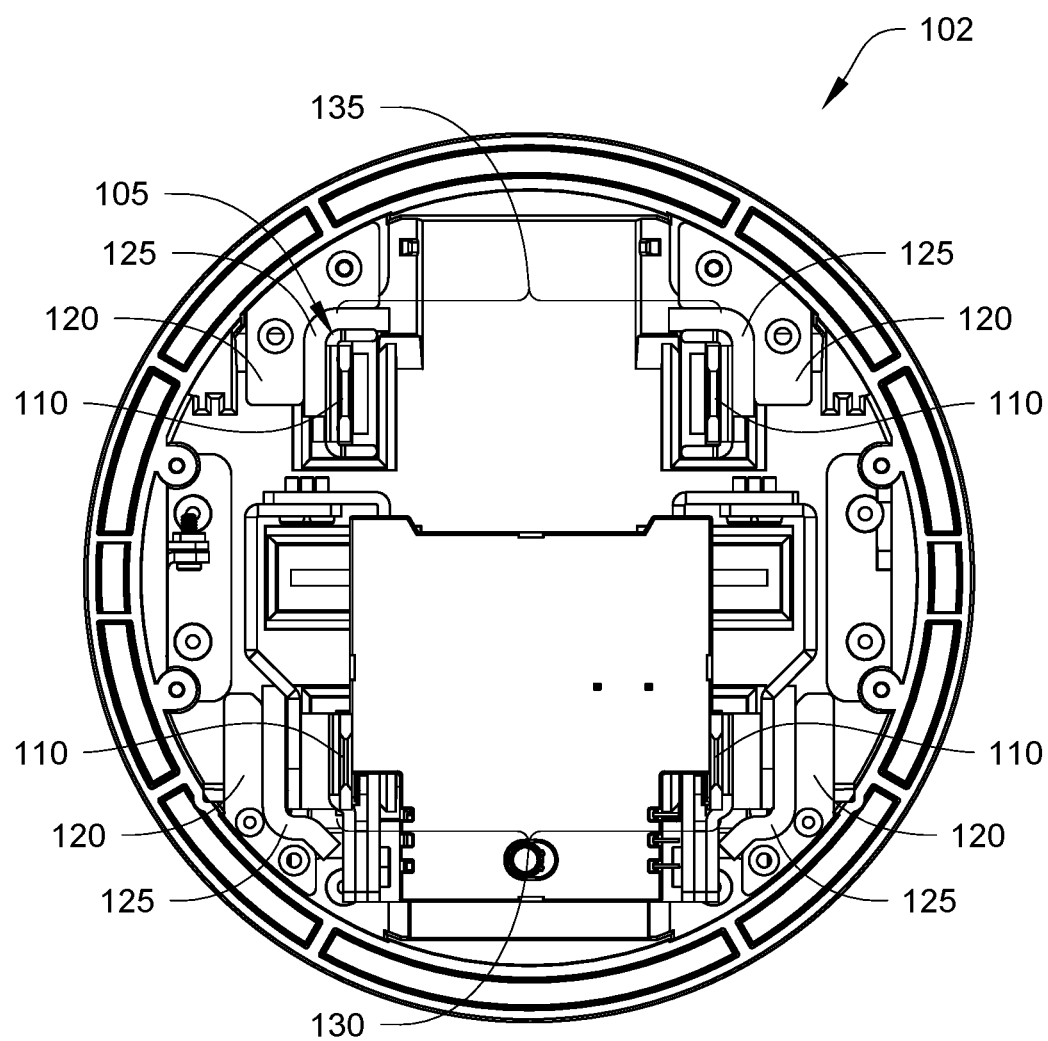
FIG. 3 shows a non-limiting example of an interior of a meter collar adapter, in accordance with at least some embodiments described and recited herein.

FIG. 3 shows a non-limiting example of an interior of a meter collar adapter, in accordance with at least some embodiments described and recited herein. FIG. 3 presents a planar view of the bottom side of the MCA 100 with transparency through a bottom of the lower housing to better illustrate the electrical components shown in FIG. 1C.

Line side connections 130 may refer to an interface circuit provided to connect MCA 100 to a line side, i.e., utility side having a line 1 and line 2, of a service disconnect of the meter socket. In accordance with at least some of the embodiments described and recited herein, a respective one of line side connections 130 may include a conductor 105 in which the stab 110 of the conductor 105 is electrically connected with the utility side such that the jaw (not shown), which as previously described, may refer to an end of a blade that electrically interfaces with the electrical meter; and which may be provided in accordance with applicable ANSI standards.

Load side connections 135 may refer to an interface circuit provided to connect MCA 100 to a load side, i.e., residence/customer side, of a service disconnect of the meter socket. In accordance with at least some of the embodiments described and recited herein, a respective one of load side connections 135 may include conductor 105 such that the jaw of the conductor 105 receives therein a stab from the electric meter and the stab 110 of the conductor 105, which as previously described, may refer to an end of a blade that interfaces with the meter socket to electrically connect the utility side to the residence/customer side; and that may be provided in accordance with applicable ANSI standards.

Thermal interface material 125 may be a non-electrically conductive thermal interface between respective conductors 105 and a corresponding heat sink 120, providing thermal contact therebetween. As seen in FIG. 3, thermal interface material 125 may be disposed directly adjacent the conductor 105 such that the thermal interface material 125 is compressed between the conductor 105 and the heat sink 120 when the MCA 100 is assembled, e.g., upper assembly 101 assembled with the lower assembly 102. Non-electrically conductive thermal interface material 125 contributes to electrically isolating upper assembly 101 and bottom assembly 102, which may be conducive to a touch-safe implementation of MCA 100, and thermally transferring heat generated at conductor 105 to heat sink 120.

Thermally conductive heat sinks 120, made of thermal conducting material draw heat from a respective one of conductors 105 and a corresponding thermal interface 125.

Because environmental conditions such as ambient temperature, solar heating, and/or heat generated due to the flow of electrical current, internal temperatures of MCA 100 could rise to levels well in excess of the rated operating values of the internal electronic components and standard base threshold values, as noted above. Further, heat within an interior of MCA 100 may be generated at a junction of two or more metal types. In the embodiment of FIG. 3, significant heat buildup may be generated at respective ones of jaws 115, which are described in more detail with regard to FIGS. 4A and 4B. Regardless, accordingly, the one or more heat sinks 120 may be provided to channel thermal buildup from within MCA 100 to an outer surface thereof.

For example, in accordance with at least one non-limiting example embodiment, heat generated at the junction of the jaws 115 of the conductor 105 of the MCA 100 and the stab from the electric meter flows through a thermal pathway along the conductor 105. At the interface of the conductor 105 and thermal interface material 125, heat may transfer from the conductor 105 to thermal interface material 125 and from thermal interface material 125 to heat sink 120. It is understood that such disclosure is not intended to be limiting in scope, but rather, other embodiments of the connection between a heat generating component, e.g., due to an electrical connection, e.g., electric load, and thermal interface material 125 and heat sink 120 may be envisioned. For example, the interface between the conductor 105 and thermal interface material 125 may be provided along any portion of conductor 105 or through a secondary thermal conduction path, e.g., multiple conductors 105 may be connected to a bus bar such that heat generated at multiple conductors 105 may be thermally conducted via the bus bar to thermal interface material 125 and/or heat sink 120.

Figure 4A:
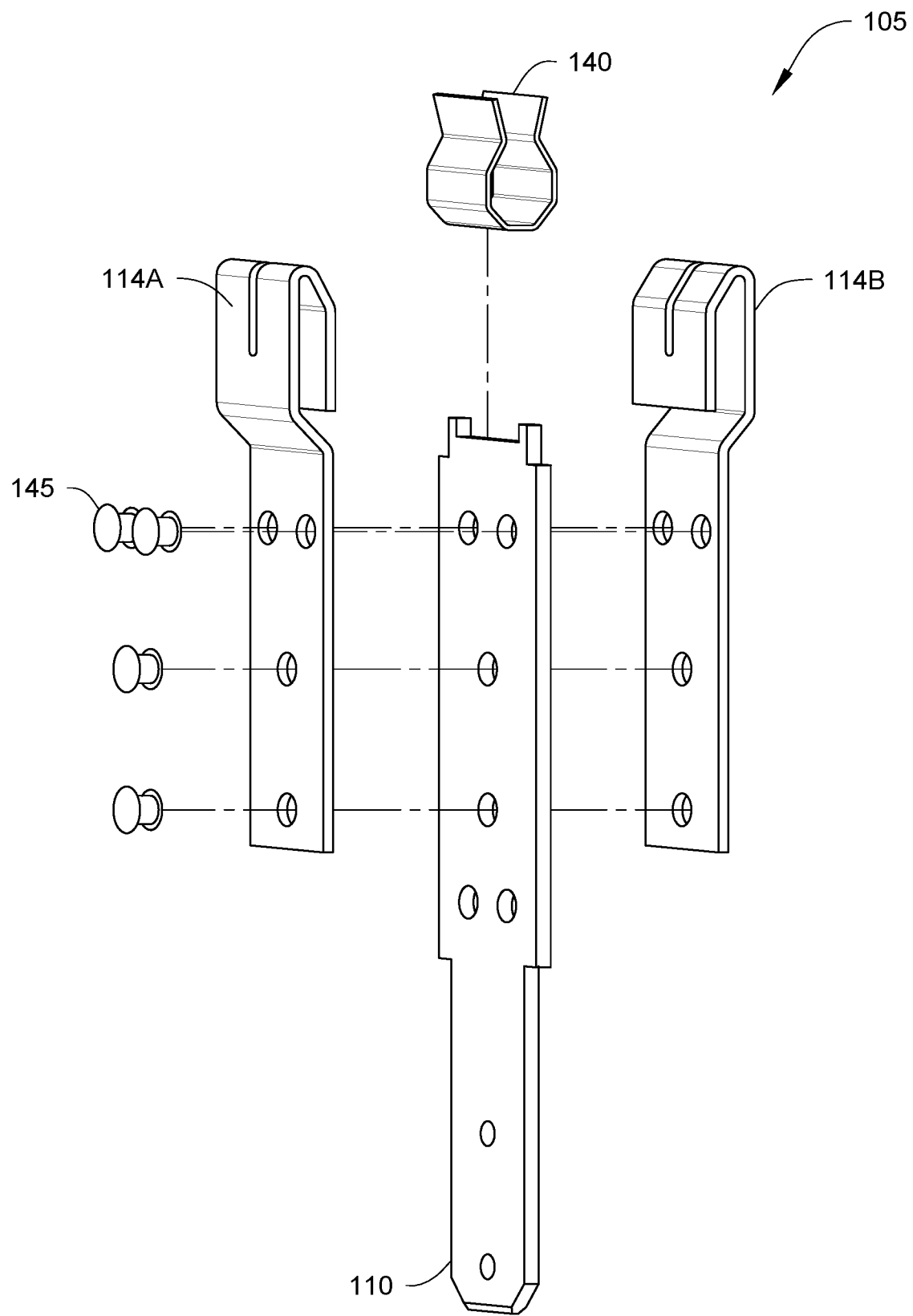
FIG. 4A shows a non-limiting example of parts for a blade assembly, in accordance with at least some embodiments described and recited herein.

FIG. 4A shows a non-limiting example of parts for a blade assembly, in accordance with at least some embodiments described and recited herein. As depicted, blade assembly 105 includes at least bus bar 110, a stab 11X connected to the bus bar 110, symmetrical jaw components 114A and 114B, steel spring 140, and fasteners 145.

Bus bar 110 may refer to a body of the blade assembly 105. Stab 11X may refer to a distal end of blade assembly 105, of which two or more may pass through at least lower assembly 102, configured to electrically interface with a meter socket. In accordance with at least one example embodiment, bus bar 110 and stab 11X may be a copper plate configured in accordance with ANSI dimension, e.g., 0.094" thick (z-axis), forming a primary electrical pathway between a meter socket and meter.

Jaw components 114A and 114B may refer to separable, yet identical or substantially identical copper bus bars that are configured to enclose a top portion of stab 110 and extend beyond the top end of bus bar 110, with steel spring 140 enclosed between a top portion of both components 114A and 114B. The reference to a top portion of bus bar 110 is with regard to the lower assembly 102 as it faces upper assembly 101. In accordance with at least one example embodiment, each of jaw components 114A and 114B may be configured in accordance with ANSI dimension, e.g., 0.063" thick (z-axis).

Once again, the values referenced herein are provided as examples only, for the purpose of providing an enabling disclosure, and are not intended to be limiting in any manner, since capabilities and/or standards may evolve.

Jaw components 114A and 114B may have a same width (x-axis) as stab 110, and may be fastened or welded to opposing planar sides of stab 110. Jaw components 114A and 114B provide equal or substantially equal surface contact on either planar side of bus bar 110, and double the current-carrying surface area that contacts bus bar 110.

Steel spring 140, positioned between top portions of jaw components 114A and 114B that extend beyond the top end of bus bar 110, may be provided to provide planar tension between portions of jaw components 114A and 114B and the corresponding planar sides of bus bar 110. In accordance with at least one example embodiment, spring 140 may be configured in accordance with ANSI dimension, e.g., 0.032" thick (z-axis) so as to fit between the upper portions of jaw components 114A and 114B to provide consistent, long-term tension therebetween.

Fasteners 145 may refer to pins or rivets that penetrate through jaw components 114A and 114B, as well as the upper portion of bus bar 110, to maintain the contact therebetween.

Figure 4B:
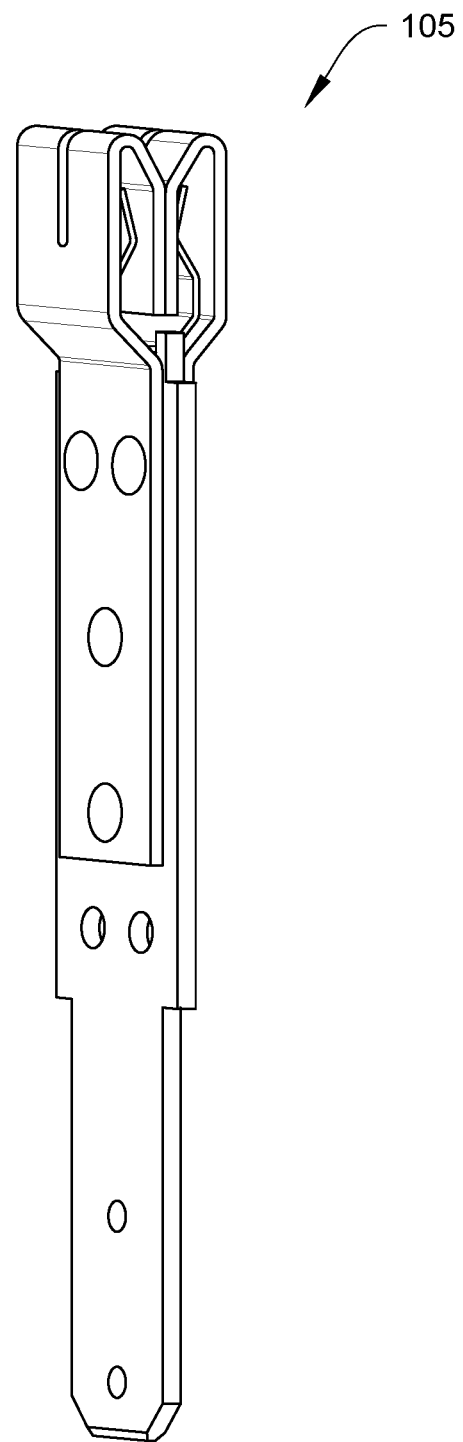
FIG. 4B shows a non-limiting example of the combined blade assembly, in accordance with at least the embodiment of FIG. 4A.

FIG. 4B shows a non-limiting example of the combined blade assembly, in accordance with at least the embodiment of FIG. 4A. It is appreciated that in view of the symmetrical structure of the blade assembly, and specifically, the connection of the jaw components with the planar sides of stab 110 that provides equal or substantially equal surface contact on either planar side of bus bar 110, the combined blade assembly may be able to double the current-carrying surface area that contacts bus bar 110. As such, the heat generated when an electrical load flows through the MCA 100 is reduced, e.g., due to increasing the area of contact and reducing electrical resistance through the blade assembly. Moreover, in view of jaw components 114A, 114B being connected via spring 140, it is appreciated that the blade assembly has greater tensioning and contact with the blade, for example, due to the sandwiching effect of the jaw components and the connected stab.

In an embodiment, the line side 130 connections of the MCA 100 include the blade assembly as shown in FIG. 4B. In another embodiment, both the line side 130 and the load side 135 connections of the MCA include the blade assembly as shown in FIG. 4B.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A meter collar adapter, comprising:
    an upper assembly that includes an outer housing; a lower assembly to house electrical components;
    one or more conductors that pass through at least the lower assembly, each of the one or more conductors comprising:
        a first end to electrically interface with a meter socket, and
        a second end to electrically interface with an electrical meter; and
        one or more thermally conductive heat sinks to transfer heat out of the lower assembly, the one or more thermally conductive heat sinks in thermal contact with at least one of the one or more conductors.

2. The meter collar adapter of claim 1, wherein the upper assembly includes a thermally conductive outer surface to dissipate heat from the interior of the meter collar adapter.

3. The meter collar adapter of claim 1, further comprising a non-electrically conducting thermal interface material disposed between the one or more heat sinks and portions of the one or more conductors passing through the lower assembly.

4. The meter collar adapter of claim 3, wherein the thermal interface material is compressed between the respective one or more conductors and the one or more heat sinks to transfer heat from the one or more conductors passing through the lower assembly to respective ones of the heat sinks.

5. The meter collar adapter of claim 3, wherein the thermal interface material electrically isolates the one or more conductors passing through the lower assembly from the heat sinks.

6. The meter collar adapter of claim 1, wherein the first end of the one or more conductors has dimensions in accordance with ANSI C12.10.

7. The meter collar adapter of claim 1, wherein the second end of the one or more conductors has dimensions in accordance with ANSI C12.7.

8. The meter collar adapter of claim 1, wherein the one or more conductors comprise laterally facing clamps to secure a corresponding conductor of the electrical meter therebetween.

9. The meter collar adapter of claim 8, wherein the laterally facing clamps increase current-carrying surface area of the conductor.

10. The meter collar adapter of claim 8, further comprising a spring disposed between upper portions of the laterally facing clamps to provide consistent tension between the clamps towards the second end of the corresponding conductor therebetween.

11. The meter collar adapter of claim 1, wherein the one or more conductors are comprised of a copper bus bar.

12. The meter collar adapter of claim 8, wherein the clamps are comprised of copper.

13. The meter collar adapter of claim 8, wherein the clamps are fastened together with the second end therebetween.

14. The meter collar of claim 8, wherein the clamps are riveted together with the second end of the conductor therebetween.

15. A meter collar adapter, comprising:
an upper assembly comprising an outer housing;
a lower assembly to house electrical components; and
one or more conductors that pass through at least the lower assembly, each of the one or more conductors comprising:
a first end to electrically interface with a meter socket, and
a second end to electrically interface with an electrical meter, the second end comprising laterally facing clamps to secure the second end to the electrical meter.

16. The meter collar adapter of claim 15, further comprising a spring disposed between upper portions of the laterally facing clamps to provide consistent tension between the clamps towards a corresponding conductor of the electrical meter therebetween.

* * * * *